(12) United States Patent
Bornais

(10) Patent No.: US 11,772,589 B2
(45) Date of Patent: Oct. 3, 2023

(54) SINGLE CELL PARTITION FOR LAW ENFORCEMENT VEHICLE

(71) Applicant: Troy Sheet Metal Works, Inc., Montebello, CA (US)

(72) Inventor: Mark Bornais, Montebello, CA (US)

(73) Assignee: TROY SHEET METAL WORKS, INC., Montebello, CA (US)

(*) Notice: Subject to any disclaimer, the term of this patent is extended or adjusted under 35 U.S.C. 154(b) by 161 days.

(21) Appl. No.: 17/192,868

(22) Filed: Mar. 4, 2021

(65) Prior Publication Data
US 2022/0281400 A1 Sep. 8, 2022

(51) Int. Cl.
*B60R 21/12* (2006.01)
(52) U.S. Cl.
CPC .................................. *B60R 21/12* (2013.01)
(58) Field of Classification Search
CPC ............................ B60R 21/12; B60R 21/026
See application file for complete search history.

(56) References Cited

U.S. PATENT DOCUMENTS

| | | |
|---|---|---|
| 3,169,781 A | 2/1965 | Abruzzino |
| 3,190,687 A | 6/1965 | Johnson |
| 4,546,728 A | 10/1985 | May |
| 4,592,523 A | 6/1986 | Herndon |
| 4,919,467 A | 4/1990 | Guimelli |
| 4,924,814 A | 5/1990 | Beaudet |
| 4,947,883 A | 8/1990 | Mayo |
| 4,964,666 A | 10/1990 | Dillon |
| 5,054,837 A | 10/1991 | Chapman |
| 5,058,941 A | 10/1991 | Soloman et al. |
| 5,080,416 A | 1/1992 | Dirck |
| 5,511,842 A | 4/1996 | Dillon |
| 5,536,057 A | 7/1996 | Stewart |
| 5,848,817 A | 12/1998 | Niehaus |
| 6,669,259 B2 | 12/2003 | Murray et al. |
| 6,827,382 B2 | 12/2004 | Murray et al. |
| D932,405 S | 10/2021 | Setina et al. |
| 11,135,989 B2 | 10/2021 | Reynolds et al. |

(Continued)

FOREIGN PATENT DOCUMENTS

| | | | |
|---|---|---|---|
| CN | 111791826 A | * 10/2020 | ............. B60R 21/12 |
| DE | 2045871 A1 | 3/1972 | |
| NL | 7604715 A | 11/1977 | |

OTHER PUBLICATIONS

Partitions—Window Armor & Door Panels Bio Seats & Floor Pans—Complete Transport Systems, Jotto Desk Prisoner Transport, https://jottopublicsafety.gojotto.com/prisoner-transport.html, 55 Pages.

(Continued)

*Primary Examiner* — Drew J Brown
*Assistant Examiner* — Matthew D Lee
(74) *Attorney, Agent, or Firm* — Lowe Graham Jones PLLC

(57) ABSTRACT

The single cell partition forms a barrier between front and rear passenger areas of a vehicle, and provides access to a portion of the rear passenger area by occupants of the front passenger area who are not in custody. In addition, the single cell partition protects and secures custodial occupants contained therein from non-custodial occupants present in the additional available space in the rear passenger area.

17 Claims, 2 Drawing Sheets

(56) References Cited

U.S. PATENT DOCUMENTS

| | | | | |
|---|---|---|---|---|
| 2005/0062304 A1* | 3/2005 | Murray | ............... | B60R 7/14 |
| | | | | 296/24.42 |
| 2007/0135034 A1* | 6/2007 | Lack | ............... | B60J 1/20 |
| | | | | 454/196 |
| 2020/0031303 A1* | 1/2020 | Reynolds | ............... | B60R 21/12 |
| 2021/0206321 A1* | 7/2021 | Setina | ............... | B60R 7/02 |

OTHER PUBLICATIONS

Cages—Custom Cages Inc., https://customcageinc.com/cages/, 8 Pages.
Single Cell Detainee Safety Seats, Go Rhino Public Safety, https://publicsafety.gorhino.com/c-1389527-single-cell-safety-seats.html, 2 Pages.
Pro-Cells Archives—Pro-Gard, https://www.pro-gard.com/product-category/products/prisoner-transport/pro-cells/, 3 Pages.
Single Prisoner Partitions, Setina Manufacturing, https://setina.com/partitions/single-prisoner-partition/, 4 Pages.
Transportation "Max" for Trucks, Setina Manufacturing, https://setina.com/trans-max-for-trucks/, 5 Pages.
First in Law Enforcementeqipment, Setina Anniversary Edition Brochure, Setina Manufacturing Company, 40 Pages.
Westin Public Safety Division, Ford Police Interceptor Utility 2022 Catalogs, 4 Pages.

\* cited by examiner

SINGLE CELL PARTITION FOR LAW ENFORCEMENT VEHICLE

FIELD OF THE INVENTION

The present invention generally relates to a single cell partition system and method. More specifically, the invention relates to a system and method providing a single cell partition for a vehicle usable for law enforcement applications, for example.

BACKGROUND OF THE INVENTION

Vehicle partitions are commonly employed to separate the front and rear seat compartments of vehicles such as police cars, taxi cabs, etc., to prevent access to the front seat by someone located in the rear seat. Typically, these partitions include a dividing wall located behind the front seats of the vehicle that forms a barrier between the front seat occupants and the rear seat occupants.

Examples of conventional single barrier partitions include U.S. Pat. No. 3,169,781, issued on Feb. 16, 1965 to Samuel A. Abruzzino, U.S. Pat. No. 3,190,687, issued on Jun. 22, 1965 to Wallace M. L. Johnson, U.S. Pat. No. 4,919,467, issued on Apr. 24, 1990 to Mark A. Guimelli, U.S. Pat. No. 4,964,666, issued on Oct. 23, 1990 to John A. Dillon, U.S. Pat. No. 5,058,941, issued on Oct. 22, 1991 to Tony J. Soloman et al., U.S. Pat. No. 5,511,842, issued on Apr. 30, 1996 to John A. Dillon, U.S. Pat. No. 5,536,057, issued on Jul. 16, 1996 to John M. Stewart, German Patent document number 2,045,871, published on March 1972, and Netherlands Patent document number 7,604,715, published on November 1977.

Other vehicle partition configurations include an animal transportation container, as described in U.S. Pat. No. 4,546,728, issued on Oct. 15, 1985 to Gary A. May, an ejection seat restraint system for limbs and hands, as described in U.S. Pat. No. 4,592,523, issued on Jun. 3, 1986 to Gerald F. Herndon, a pet restrainer, as described in U.S. Pat. No. 4,924,814, issued on May 15, 1990 to Alain B. Beaudet, a sun shade arrangement for a vehicle, as described in U.S. Pat. No. 4,947,883, issued on Aug. 14, 1990 to Kay L. Mayo, a vehicle divider for dividing a common seat between passengers, as described in U.S. Pat. No. 5,054,837, issued on Oct. 8, 1991 to Dorothy L. Chapman, and a prisoner transport module, as described in U.S. Pat. No. 5,080,416, issued on Jan. 14, 1992 to Ronald L. Dirck.

None of the above inventions and patents, taken either singly or in combination, is seen to describe the instant invention as claimed.

SUMMARY OF THE INVENTION

The present invention is a single cell partition or vehicle security cage for use in combination with a vehicle having front and rear passenger areas with front and rear seats having surfaces therein, a floor, a ceiling, a side internal surface, and a rear internal surface. The single cell partition forms a barrier between front and rear passenger areas of a vehicle, and provides access to a portion of the rear passenger area by occupants of the front passenger area who are not in custody. In addition, the single cell partition protects and secures custodial occupants contained therein from non-custodial occupants present in the additional available space in the rear passenger area. The single cell partition is generally configured in an U-shaped arrangement with a front wall assembly intended to be placed directly behind the front seat connected to a rear side panel placed between the non-custodial rear seat portion and the custodial rear seat portion. The front wall assembly and rear side panel may be constructed of any of a variety of heavy-duty material, including heavy duty gage steal steel or heavy-duty alloys, for example, with a removable heavy duty first rear window panel that provides visibility to non-custodial portion of the vehicle. A second rear heavy-duty window panel is configured to provide see-through visibility to officers or persons outside the vehicle of persons in custody and within the partition. The first and second heavy-duty window panels may be constructed of unbreakable glass, lexan, etc., or a combination of such materials.

The single cell partition provides a secure area for an occupant in a portion of the rear passenger area, preferably approximately one-third to one-half of the rear passenger area. This enables the occupant or occupants of the front seats to operate and generally perform their duties without concern about interference from the occupant or occupants of the rear seat. Furthermore, the vehicle security cage provides additional space for non-custodial occupants for storage and access to equipment that should not be accessible to the passenger in custody within the single cell partition. Alternatively, the additional space in the rear passenger area may be used to accommodate a security animal such as a K-9 unit (dog).

The front panel is configured to extend from the ceiling of the vehicle to the floor of the vehicle, with a kick space defined at the bottom of the front panel that provides ample leg room for a custodial occupant. The front panel and side panel each includes bolting, bracketing, or welding means for bolting, welding, or otherwise fastening single cell partition to the internal surface of the vehicle.

Accordingly, it is a principal object of the invention to provide a single cell partition that effectively isolates occupants seated in the single cell partition from occupants seated in the front passenger area while providing a separate area for non-custodial passengers in the rear seat or access to the separate non-custodial portion by occupants of the front passenger area.

It is a further object of the invention to provide improved elements and arrangements thereof in a vehicle security cage for the purposes described which is inexpensive, dependable and fully effective in accomplishing its intended purposes.

These and other objects of the present invention will become readily apparent upon further review of the following specification and drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Figure 1:
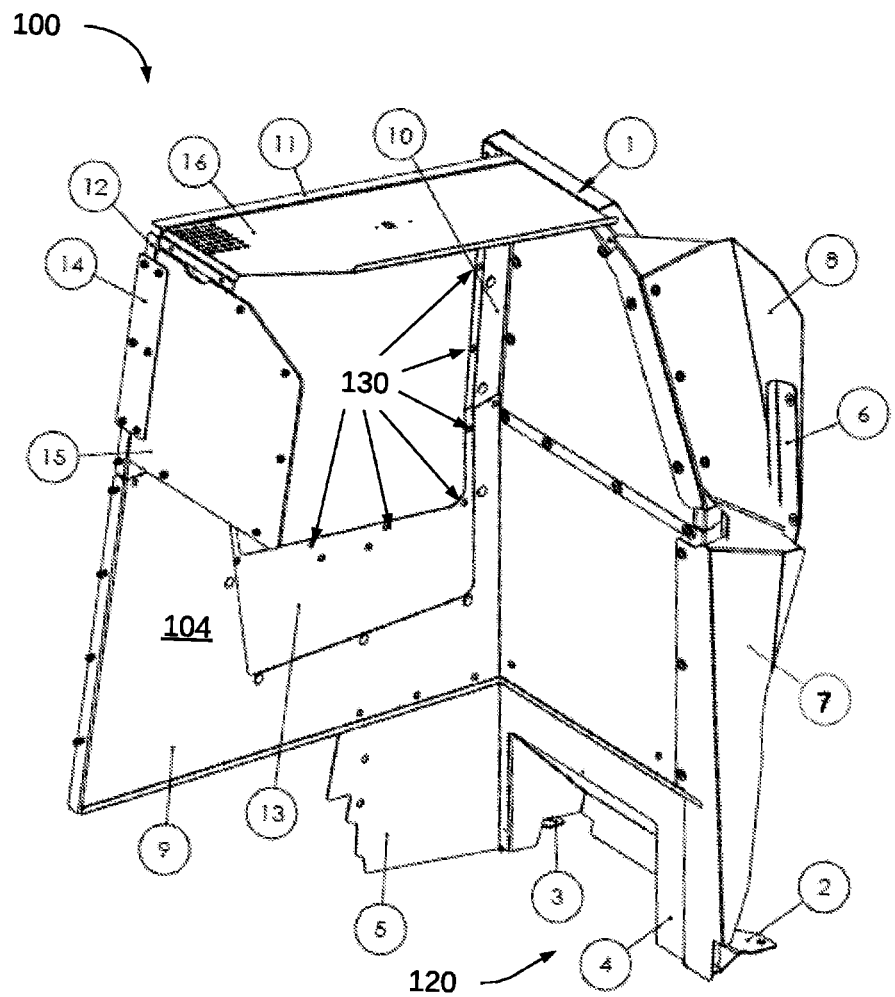
FIG. 1 is a diagrammatic rear right perspective view of a single cell partition according to one embodiment.

Broadly, embodiments of the present invention generally provide a single cell partition system and method. With reference to FIG. 1, a diagrammatic rear right perspective view of a single cell partition is shown according to one embodiment. A single cell partition 100 or vehicle security cage is for use in combination with a vehicle having front and rear passenger areas with front and rear seats having surfaces therein, a floor, a ceiling, a side internal surface, and a rear internal surface.

The single cell partition 100 forms a barrier between front and rear passenger areas of a vehicle, and provides access to a portion of the rear passenger area by occupants of the front passenger area who are not in custody. In addition, the single cell partition 100 protects and secures custodial occupants contained therein from non-custodial occupants present in the additional available space in the rear passenger area.

The partition 100 is connectable as a modular unit to the interior of the vehicle, including using a number of brackets, such as a inner foot bracket 2, an outer foot bracket 3, a B pillar bracket 6 and a bracing plate on top 16.

The single cell partition 100 is generally configured in a U-shaped arrangement with a front wall assembly 1 intended to be placed directly behind the front seat, said front wall assembly 1 being connected to a side panel 104 placed between the non-custodial rear seat portion and the custodial rear seat portion. The side panel 104 may comprise a rear side panel portion 12, a front side panel portion 10 and a lower side panel portion 9. The front wall assembly 1 and side panel 104 may be constructed of any of a variety of heavy-duty material, including heavy duty gage steel, heavy-duty alloys, Kevlar, carbon fiber, or plastic, for example. A removable heavy duty first rear window panel 13 provides visibility to the non-custodial portion of the vehicle. The first window panel 13 may be secured between the front side panel portion 10, the rear side panel portion 12, and lower side panel portion 9 by means of removable bolts that are removable from the outside of the partition 100 from the non-custodial portion of the rear seat.

An upper wing 8 and a lower wing 7 provide for shaped fit into the door panel region of the vehicle.

In one embodiment, removability of the first window panel 13 may be provided by means of rapidly removable bolts 130 that allow for rapid removal of the first window panel 13, in case of emergency or accident requiring fast extraction of a person in custody from within the partition 100, when fast and safe removal is not possible through normal exit through the vehicle door. For example, in the event of a vehicle accident wherein the rear door is jammed on the partition side, it may be necessary to rapidly remove the first window panel 13 in order to extract the person in custody. Examples of rapidly removable bolts 130 that can be used include, by way of example and not by way of limitation, spring loaded bolts readily available from Galvanised Specialists Ltd of Wes Midlands, United Kingdom, retaining pin bolts readily available from the same company, other types of rapid pull-pin bolts that allow for fast and easy disengagement of removable bolts 130 if a person needs rapid extraction from the partition 100.

A second rear heavy-duty window panel 15 connected to the side panel 104, via a backing plate 14, is configured to provide see-through visibility to officers or persons outside the vehicle of persons in custody and within the partition assembly 100. The first and second heavy-duty window panels 13 and 15 may be constructed of unbreakable glass, lexan, etc., or a combination of such materials.

The front wall assembly 1 is configured to extend from the ceiling of the vehicle to the floor of the vehicle, with a kick space 120 defined at the bottom of the front wall assembly 1 formed by a shaped indentation of a kick panel 4, that provides ample leg room for a custodial occupant, adjacent to a side kick panel 5 down to the floor on the side. The front wall assembly 1 and side panel each includes bolting, bracketing, or welding means for bolting, welding, or otherwise fastening single cell partition 100 to the internal surface of the vehicle.

Figure 2:
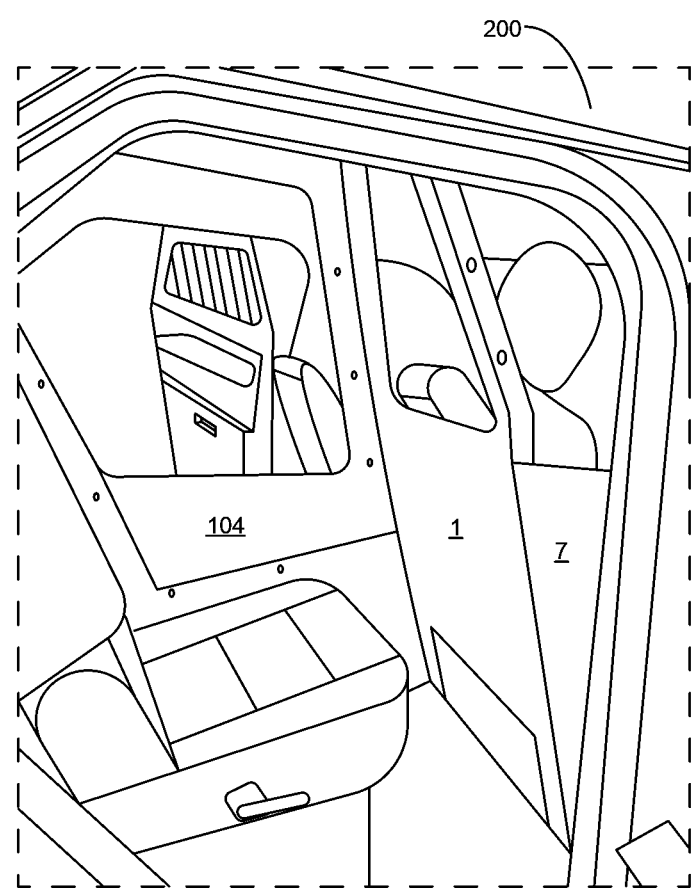
FIG. 2 is a view of a partition installed in a vehicle according to the embodiment of FIG. 1.

FIG. 2 is a view of a partition 100 installed in a vehicle 200. In FIG. 2, the installed side panel 104 and the lower wing 7 is shown fitted into the vehicle 200.

It should be understood, of course, that the foregoing relates to exemplary embodiments of the invention and that modifications may be made without departing from the spirit and scope of the invention as set forth in the following claims.

The invention claimed is:

1. A cell partition for a vehicle that has a front seat and a rear seat, the rear seat of the vehicle having a seat back, a non-custodial rear seat portion, and a custodial rear seat portion, the cell partition comprising:
   a side panel configured to couple to a front wall assembly that is disposed between the front seat and the rear seat, the side panel extending from the front wall assembly to the seat back of the rear seat with the side panel disposed between the non-custodial rear seat portion and the custodial rear seat portion of the vehicle, the side panel defining an opening configured to enable removal of a person from the custodial rear seat portion through the opening; and
   a second panel configured to selectively block passage of the person through the opening and to selectively permit removal of the person from the custodial rear seat portion through the opening,
   whereby the second panel facilitates removal of the person from the custodial rear seat portion through the opening in case of emergency or vehicle accident.

2. The cell partition of claim 1, further comprising spring loaded bolts configured to couple the second panel to the side panel, whereby the spring loaded bolts facilitate decreasing time to transition the second panel between blocking passage of the person through the opening and permitting removal of the person from the custodial rear seat portion through the opening.

3. The cell partition of claim 1, further comprising removable pins configured to couple the second panel to the side panel, whereby the removable pins facilitate decreasing time to transition the second panel between blocking passage of the person through the opening and permitting removal of the person from the custodial rear seat portion through the opening.

4. The cell partition of claim 1, further comprising a clear window portion configured to couple to the side panel with the second clear window portion positioned above the custodial rear seat portion when the partition is installed in the vehicle.

5. The cell partition of claim 1, comprising heavy duty gage steel.

6. The cell partition of claim 1, comprising alloy.

7. The cell partition of claim 1, comprising aramid fibers.

8. The cell partition of claim 1, comprising carbon fiber.

9. The cell partition of claim 1, wherein the side panel defines a first side and a second side that is opposite the first side, the first side facing the custodial rear seat portion when the side panel extends from the front wall assembly to the seat back of the rear seat, the second panel being configured to permit removing the second panel from the side panel from only the second side of the side panel.

10. The cell partition of claim 1, further comprising fasteners disposed along the perimeter of the second panel that are configured to couple the second panel to the side panel.

11. The cell partition of claim 10, wherein the side panel defines a first side and a second side that is opposite the first side, the first side facing the custodial rear seat portion when the side panel extends from the front wall assembly to the seat back of the rear seat, the fasteners being removable from the second side of the side panel.

12. The cell partition of claim 1, wherein the side panel defines a first side and a second side that is opposite the first side, the first side facing the custodial rear seat portion when the side panel extends from the front wall assembly to the seat back of the rear seat, the second panel enabling viewing the custodial rear seat portion through the second panel from the second side of the side panel.

13. The cell partition of claim 1, wherein the side panel has a kick panel that extends below the custodial rear seat portion to a floor of the vehicle.

14. The cell partition of claim 13, wherein the kick panel is configured to modularly couple to the side panel.

15. The cell partition of claim 1, further comprising the front wall assembly, wherein the front wall assembly defines a kick panel having an indentation that is configured to receive feet of the person while the person sits on the custodial rear seat portion.

16. The cell partition of claim 1, further comprising a plate that extends along a top portion of the side panel.

17. The cell partition of claim 1, further comprising a third panel configured to couple to the side panel and extend away from the side panel above the custodial rear seat portion, the third panel being configured to be disposed opposite the side panel from the front wall assembly when the side panel extends from the front wall assembly to the seat back of the rear seat.

* * * * *